UNITED STATES PATENT OFFICE.

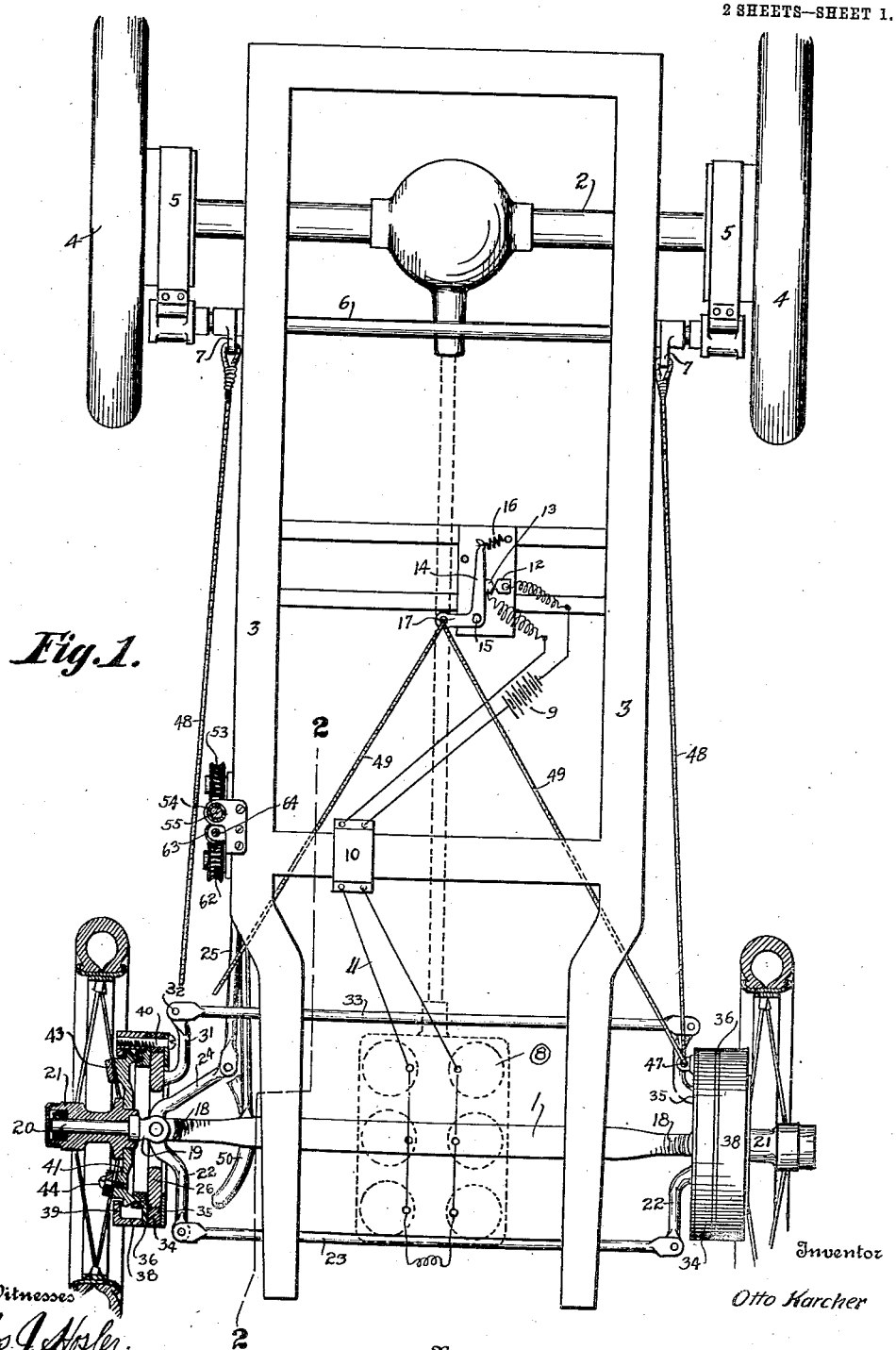

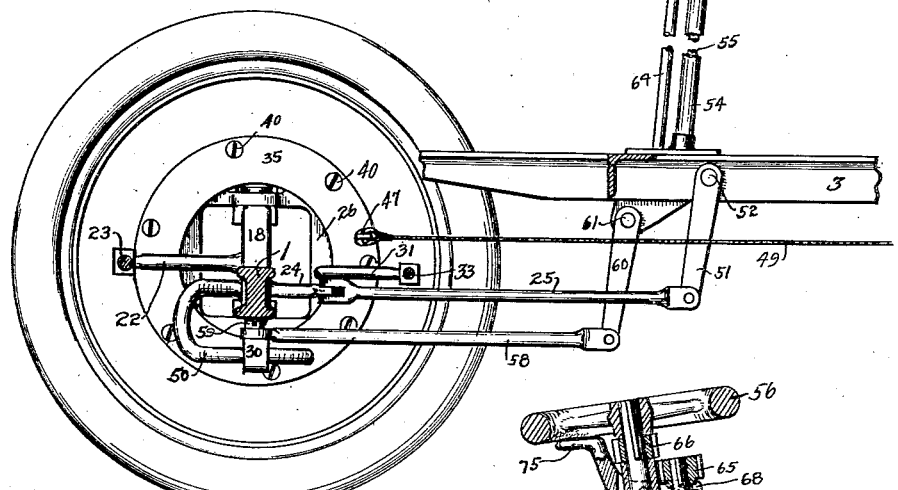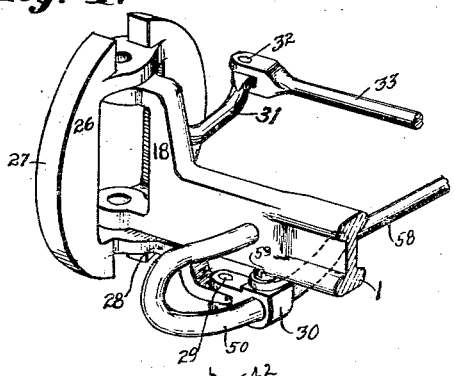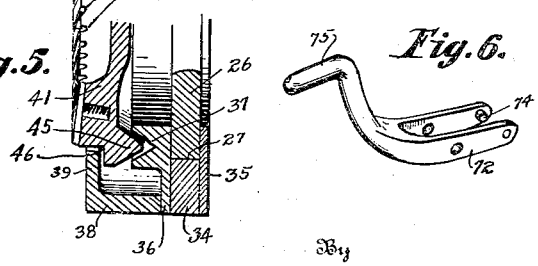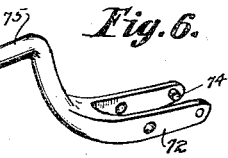

OTTO KARCHER, OF CANTON, OHIO.

AUTOMOBILE SAFETY DEVICE.

943,227.  Specification of Letters Patent.  Patented Dec. 14, 1909.

Application filed May 25, 1909. Serial No. 498,350.

*To all whom it may concern:*

Be it known that I, OTTO KARCHER, a citizen of the United States, residing at Canton, in the county of Stark and State of Ohio, have invented a new and useful Automobile Safety Device, of which the following is a specification.

It is a well known fact that many accidents of serious nature are caused by the breaking of the steering gear of automobiles. My invention relates to a device which is intended, when such break of the steering gear occurs, and when the front wheels are thereby permitted to take their own course or swerve to the side, to shut off the power, to apply the emergency brake and to hold the said front wheels in the position in which they were at the time when the break occurred.

The object of my invention is to prevent the accidents above mentioned by equipping automobiles with a device which is simple in construction, positive in operation and comparatively easily made, while at the same time being adapted to fully accomplish its purposes. I attain this object by the construction illustrated in the accompanying drawings, in which—

Figure 1 is a top view of the chassis of an automobile provided with a safety device in accordance with my invention, parts being shown in section. Fig. 2 is a fragmentary elevation illustrating one of the front wheels from the inner side and the steering post and connections, said view being taken on the line 2—2 of Fig. 1. Fig. 3 is a fragmentary view, partly in vertical section of the outer side of the steering post and its connections. Fig. 4 is a perspective view from the inner side, illustrating one of the ends of the front axle and the clutch plate support and connections. Fig. 5 is an enlarged sectional view through a portion of one of the safety clutches. Fig. 6 is a perspective view of the emergency lever.

Throughout the several views similar numerals of reference indicate similar parts.

The numeral 1 indicates the front axle and the numeral 2 the rear axle of the automobile. Mounted upon said axles in any suitable mechanical manner is the frame 3 which is adapted to support the body of the automobile (not shown) and also other portions of the device as hereinafter described. Upon the rear axle 2 are mounted the rear or driving wheels 4 in any suitable manner and upon each of said wheels is arranged a suitable band brake 5 operatively connected to the shaft 6, which shaft is preferably journaled to the frame 3 and which shaft is rotated by the forward movement of the levers 7 connected thereto. The peculiar construction of the said brakes is not claimed as a part of the present invention and any suitable construction of said brakes may be employed. It is desirable, however, in connection with the present invention, to provide such a brake as may be operated by the forward movement of a lever, as for instance by the forward movement of the levers 7 above mentioned.

The gasolene engine 8 or its equivalent may be of any suitable construction and said engine together with its connection with the rear axle is shown conventionally in dotted lines. In case a gasolene engine is employed some form of electric energy, as the battery 9, as well as the coil 10 should be employed and the conductors 11 should be provided to form the appropriate circuit through the engine. Within the circuit is arranged a switch comprising a stationary point 12 and a movable point 13 mounted upon the lever 14. The said lever 14 is pivoted at the point 15 to a suitable support and the spring 16 is provided for the purpose of normally holding the points 12 and 13 in contact to close the circuit. The lever 14 is provided with the right angled arm 17 which may be drawn forward, against the tension of the spring 16, for the purpose of rocking the lever 14 and separating the points 12 and 13. When the points 12 and 13 are thus separated it will be understood that the circuit will be opened, thus stopping the operation of the engine.

Upon each end of the front axle 1 is arranged a yoke 18 in which is pivotally mounted the knuckle 19 to which is connected the spindle 20 upon which the hub 21 of one of the front wheels is rotatably mounted. The details of construction of the said yoke, knuckle and spindle may be somewhat varied from that shown in the drawings, the construction shown however being a desirable form. To each knuckle 19 is connected a forwardly extending arm 22, and the connecting rod 23 is pivotally connected to the forward ends of the said arms, whereby the two knuckles are caused to make pivotal movement in a simultaneous and harmonious manner, as well understood in the art. To one of the knuckles 19 is also connected the arm 24 to which is pivotally connected the rearwardly extending steering rod 25, the further connections of which rod will be hereinafter more fully explained.

Pivotally mounted on pivotal connections in the axes of the pivotal connections between the yokes 18 and the knuckles 19 are the clutch plate supports 26 which consist of circular disks provided with smooth peripheral bearing edges 27. An arm 28 is preferably formed integrally with the support 26 upon the same side of the device as that upon which the arm 24 is arranged, extends inwardly, and is pivotally connected at 29 to the locking slide 30, hereinafter to be more fully described. The arms 31 are also connected to the supports 26 extend rearwardly, and are pivoted at the points 32 to the connecting rod 33. The said connecting rod 33 is thus adapted to cause the simultaneous and harmonious pivotal movement of the two supports 26 in practically the same manner as the rod 23 accomplishes a similar result with respect to the knuckles 19.

Mounted upon each clutch plate support 26 is the ring 34 which is adapted to slide annularly along the bearing edge 27. The annular retaining plate 35 is arranged upon the inner side of the ring 34 and extends a short distance over the inner side of the support 26. Upon the outer side of the ring 34 the annular clutch plate 36 is arranged, which plate is provided with an annular, outwardly disposed groove 37. Arranged upon the outer side of the clutch plate, and near the peripheral edge of said plate is the clutch housing 38, which is provided with an integral annular flange 39 extending toward the spindle 20 and adapted to engage a portion of the clutch and guide ring, as hereinafter more fully described. The housing 38, plate 36, ring 34, and plate 35 are connected together in any suitable mechanical manner, as by the screws 40. It will thus be understood that all of the parts just mentioned will constitute what may be termed an inner clutch member, the said structure being adapted for annular sliding movement around the support 26 and having its position at all times determined by the position of the said support.

Upon the inner side of each of the front wheels is arranged a clutch and guide ring 41, the said ring may be connected to the wheel in any suitable manner. In the construction illustrated in the drawings I have shown notches 42 to receive the spokes of the wheel, and a plate 43 connected to the said ring by means of screws 44 or their equivalents for the purpose of clamping the said ring to the said spokes. Each ring is provided with an inwardly extending annular rib 45 having its sides disposed at angles corresponding to the annular position of the sides of the groove 37, the said rib 45 being adapted to enter the said groove in the operation of the device, the engaging surfaces of said rib and said groove being adapted to form a friction clutch. Besides the rib 45 each of the rings 41 is provided with an annular guideway or ledge 46 arranged upon the inner side of the flange 39 and adapted to engage said flange in the operation of the device, as hereinafter more fully described.

Upon the inner side of each retaining plate 35 and at a point on said plate normally lying rearwardly is an eye 47. Connected to each of the said eyes are two cables 48 and 49. The cables 48 extend to the rear of the automobile where they are connected to the levers 7, which levers, as hereinbefore mentioned, operate the band brakes 5 on the rear wheels. The cables 49 are connected to the right angled arm 17 and are adapted to draw said arm forward to throw the points 12 and 13 out of contact as hereinbefore described.

Connected to the front axle 1 is the curved guide 50, which extends forwardly, downwardly and thence rearwardly under the said axle, the said guide being curved, with a radius equal to the distance from said guide to the pivotal connection of the support 26 to the yoke 18. This arrangement is clearly illustrated in Fig. 1. The locking slide 30 is provided with an aperture through which the guide 50 extends, the slide being slidably mounted upon said guide. As hereinbefore described the slide 30 is pivotally connected to the arm 28 at the point 29. The said point 29 is some distance to the side of the guide 50, and it will be understood that if the arm 28 is moved forwardly or rearwardly by the pivotal movement of the plate 26 the slide 30 will be thrown askew with reference to the guide 50, thereby locking the said slide upon the said guide and preventing any sliding movement of the slide 30 thereon.

At the rear end of the steering rod 25 the said rod is pivotally connected to the lower end of the lever 51. Said lever is fixedly mounted upon the rotatable shaft 52 to which is fixedly connected the gear 53. The steering post 54 is fixedly mounted upon the frame 3 and is provided with the internal rotatable steering shaft 55 upon which the steering wheel 56 is fixedly mounted. Upon the lower end of the steering shaft 55 is arranged the worm gear 57 meshing with the gear 53. It will be apparent that by the rotation of the steering wheel 56 the gear 53 will be operated to move the lever 51 backward or forward as desired, thus moving the steering rod 25 backward or forward and operating the arm 24 and knuckles 19 to guide the front wheels and steer the automobile in the course desired.

It will be apparent that by means of the steering mechanism just described only the knuckles 19, the spindles 20 and the front wheels will be operated. In other words the rotation of the steering shaft 55 in itself or through its immediate connections just described will not operate to move the support 26 and parts thereon mounted upon the pivotal connection of said support to the yoke 18.

For the purpose of sliding the locking slide 30 along the curved guide 50 and giving the supports 26 pivotal movement in harmony with the pivotal movement of the knuckles 19, spindles 20 and front wheels, the connecting rod 58 is pivotally attached to the slide 30 by the screw 59 or its equivalent, the other end of said rod 58 being pivotally connected to the lower end of the lever 60. Said lever is fixedly connected at its upper end to the rotatable shaft 61 upon which shaft is fixedly mounted the gear 62 which gear meshes with the worm gear 63 upon the shaft 64. The shaft 64 is arranged parallel with the steering shaft 55 and is provided at the upper end with the gear 65 normally meshing with the gear 66 on the steering shaft 55. Immediately below the gear 65 the collar 67 is fixedly mounted upon the shaft 64, in which collar is the annular groove 68, for the purpose hereinafter described. The shaft 64 is rotatably mounted in the bearings 69 and 70. Coiled about the shaft 64 intermediate the collar 67 and the bearing 69 is the coiled spring 71, said spring being adapted to normally maintain the shaft 64 in its uppermost position illustrated in Fig. 2, in which position the gears 65 and 66 are in mesh.

The emergency lever is provided with the spaced forks 72 pivoted to the steering post at the point 73 and provided with the inwardly extending lugs 74 adapted to be arranged within the groove 68. The handle portion 75 normally assumes the position illustrated in Fig. 2, but may be grasped and raised into the position illustrated in Fig. 3. When the handle is so raised the shaft 64 will be moved downwardly, pushing downwardly upon the worm gear 63 and rotating the gear 62. It will be obvious that the gear 62 may thus be rotated in either of two ways, either by the rotating of the shaft 55 when the gears 65 and 66 are in mesh, or by raising the handle 75 against the tension of the spring 71. It should be understood that as the gear 62 is rotated the lever 60 will be operated to move the connecting rod 58 backwardly or forwardly, thus sliding the locking slide 30 along the guide 50.

It should be understood that the parts of the safety clutches in connection with the front wheels should be so arranged that as the wheel revolves in the running of the automobile the surfaces of the ribs 45 will revolve very closely adjacent to the walls of the grooves 37. It should also be noted that the flanges 39 should lie quite closely adjacent the ledges 46. In the drawings the spaces between the parts just mentioned are exaggerated to more fully disclose the construction and operation of the device but it will be understood that only sufficient space to permit the wheels to freely revolve should be provided.

An automobile safety device of the character described having been provided the operation of the same is as follows. The parts being in the position illustrated in Fig. 2, when the steering wheel 56 is rotated, the shaft 55 will be rotated, and such rotation will be transmitted through the gears 66 and 65 to the shaft 64. The shafts 55 and 64 will therefore be rotated simultaneously. Let it be supposed that the wheel 56 is rotated in the direction to draw the lever 51 backward, the steering rod 25 will be drawn backward, thus drawing backward upon the arm 24 and moving the knuckles 19 upon their pivotal points, thus moving the front wheels simultaneously and harmoniously. At the same time that the lever 51 is drawn backward the lever 60 will be drawn backward, thus drawing backward upon the connecting rod 58 and sliding the locking slide 30 backward upon the guide 50, thus moving the clutch plate supports 26 upon their pivotal points and thus maintaining the portion of the safety clutches mounted upon said supports in a parallel relation with their respective front wheels. If the steering wheel 56 is rotated in the opposite direction from that just mentioned the front wheels and the supports 26 will be pivotally moved in the opposite direction. So long as the gears 65 and 66 are in mesh, therefore, the front wheels and the supports 26 will be moved simultaneously and harmoniously without permitting the ribs 45 to enter the grooves 37, or in other words without operating the safety clutches.

Let it be supposed that some portion of the steering gear controlling the front wheels is accidentally broken while the automobile is moving forwardly. The front wheels in such case, freed from control, begin to swerve to one side or the other, but the portion of the device controlling the position of the supports 26 being unbroken, said supports will be firmly held in the position in which said supports were at the time when the break occurred. As the front wheels swerve the ribs 45 will move with reference to the clutch plate 36, and the said ribs will enter the grooves 37, thus frictionally clutching the plate 36. The wheels upon which the ribs are mounted being in motion, the inner clutch member, consisting of the plate 35, ring 34, plate 36 and housing 38 will be instantly rotated or caused to slide annularly around the clutch plate supports 26. Such movement on the part of the inner clutch member will move the eyes 47 forward, drawing forward upon the cables 48 and 49 and thus operating the brakes 5 and shutting off the power by moving the point 13 out of contact with the point 12.

It should be noted that not only will the revolving wheels thus operate to shut off the power and apply the brakes and thus check and stop the forward movement of the automobile, but the front wheels will not be permitted to swerve sidewise a sufficient distance to cause accident. A certain side or swerving movement of the front wheels is permitted in order to bring the ribs 45 into engagement with the clutch plate, but the flanges 39, lying closely adjacent the ledges 46 will aid in preventing any undue swerving movement of the wheels and thus keep the automobile in the course in which it was directed at the instant when the break occurred. It will be understood that under the circumstances of a break such as herein just described the front wheels have a tendency to swerve to the side with considerable force. For the purpose of locking the supports 26 in position and preventing the locking slide 30 from moving along the guide 50 except at the will of the operator, the pivotal connection at 29, hereinbefore described, is provided. When the front wheels tend to swerve and the ledges 46 are brought into engagement with the flanges 39 the supports 26 will tend to move upon their pivotal connections to the yokes 18, but the arm 28 being drawn backward or forward as the case may be will operate upon the pivotal connection at 29 so as to throw the locking slide 30 askew with reference to the guide 50, thus frictionally locking the slide 30 in position upon said guide. In this manner the supports 26 will be maintained in proper position in case of accident without dependence upon any portion of the device except the arm 28, the locking slide 30 and the guide 50.

It will be understood that in some instances it may be desirable, in case of emergency, to operate the safety clutches although the steering gear be not broken. In such cases the operator may grasp the handle 75 and lift it into the position illustrated in Fig. 3. This will throw the gear 65 and 66 out of mesh and will push downward upon the worm gear 63, thus moving the lever 60 forward without moving the lever 51. This forward movement of the lever 60 will push forward upon the locking slide 30, thus throwing the supports 26 out of their normal positions with reference to their respective wheels and throwing the clutch plates 36 into engagement with the ribs 45. The ribs 45 will thereupon frictionally engage the sides of the grooves 37 and operate the inner clutch members in substantially the same manner as in the case of the breaking of the steering gear just above described. In this manner the brakes 5 may be operated and the points 12 and 13 thrown out of contact at the will of the operator. It should be noted that the engagement of the ribs 45 with the plates 36 is not in the nature of a positive clutch but is a frictional engagement such that sufficient power is transmitted to the inner clutch members to properly draw upon the cables 48 and 49 but permitting the ribs 45 to slip within the grooves 37 when the said cables have been drawn taut, thus permitting the front wheels to further revolve for a short space while the automobile is brought to a stop. It should also be noted that in the normal operation of the automobile the cables 48 and 49 should be sufficiently slack to permit the proper pivotal movement of the front wheels and safety clutches for the steering of the automobile. For this reason the cables may be more conveniently and successively used than rods although I do not desire to limit my invention to the use of cables.

I claim:

1. An automobile safety device comprising, rear wheels provided with brakes, driving means for said rear wheels, means for discontinuing the operation of said driving means, adjustable front wheels, means for controlling the adjustment of said front wheels, a safety clutch provided with operative connections with said brakes and with said means for discontinuing the operation of said driving means, said safety clutch being adapted to be operated by said front wheels when said wheels are not controlled by said controlling means.

2. An automobile safety device comprising in combination with the front and rear wheels of an automobile and means for driving said rear wheels, means for discontinuing the operation of said driving means, brakes arranged upon said rear wheels, outer clutch members arranged upon said front wheels, inner clutch members arranged adjacent said outer clutch members, said front wheels adapted for pivotal movement for the purpose of steering, said inner clutch members adapted for pivotal movement for the purpose of maintaining a parallel relation between said outer clutch members and said inner clutch members, said inner clutch members operatively connected to said brakes on the rear wheels and to the means adapted to discontinue the operation of the driving means, and means adapted to normally maintain said inner clutch members out of engagement with said outer clutch members by causing the simultaneous pivotal movement of said front wheels and said inner clutch members.

3. An automobile safety device comprising front and rear wheels, means for driving said rear wheels, means for discontinuing the operation of said driving means, brakes adapted to brake said rear wheels, said front wheels adapted for adjustment for the purpose of steering, controlling means connected to said front wheels for the purpose of adjusting the same, safety clutch members normally adapted to be maintained in a position parallel to the front wheels, clutch members connected to said front wheels, said clutch members adapted to engage said safety clutch members by the ungoverned swerving of said front wheels when the controlling means thereof is inoperative, and means operated by said safety clutch members for operating the means to discontinue the operation of the driving means and for applying said brakes.

4. In a device of the character described driving wheels, guiding wheels, means for braking said driving wheels, steering means for controlling said guiding wheels, safety clutches operatively connected to said braking means, said safety clutches adapted to be operated by said guiding wheels when permitted to come into contact therewith, and means operated by said steering means for the purpose of normally maintaining said safety clutches out of engagement with said guiding wheels.

5. In a device of the character described guiding wheels, driving wheels, operative driving means for driving said driving wheels, shut-off means for discontinuing the operation of said driving means, safety clutches, operative connection between said safety clutches and said shut-off means, and said safety clutches adapted to be operated by said guiding wheels.

6. In a device of the character described a front axle provided with a yoke, a knuckle pivotally connected to said yoke, a spindle connected to said knuckle, a wheel provided with a hub mounted upon said spindle, means connected to said knuckle for controlling the pivotal movement thereof, a clutch plate support pivotally connected to said yoke, said clutch plate support provided with means for controlling its pivotal movement, an inner clutch member mounted upon said clutch plate support, an outer clutch member mounted upon said wheel, means for normally causing the simultaneous and harmonious pivotal movement of said knuckle and said clutch plate support, and the clutch members adapted for engagement with each other when their pivotal movements are not simultaneous and harmonious.

7. In a device of the character described, an axle, a clutch plate support pivotally connected to said axle, an arm connected to said clutch plate support, a guide connected to said axle, a locking slide adapted for sliding movement along said guide, and the said arm pivotally connected to said locking slide.

8. In a device of the character described, an axle, a clutch plate support pivotally connected to said axle, an arm connected to said clutch plate support, a guide, a locking slide adapted for sliding movement along said guide, said arm pivotally connected to said locking slide, and a connecting rod pivotally connected to said locking slide for moving said slide along said guide.

9. In a device of the character described, in combination, a pivoted guiding wheel, a pivoted inner clutch member, steering means for controlling said guiding wheel, means operatively connected to said steering means for simultaneously and harmoniously operating said inner clutch member, and means for disconnecting said steering means from said inner clutch member operating means substantially as described.

10. In a device of the character described, in combination, a pivoted guiding wheel, a pivoted inner clutch member, steering means for controlling said guiding wheel, means operatively connected to said steering means for simultaneously operating said inner clutch member, and means for operating said inner clutch member operating means independently of said steering means.

11. In a device of the character described an axle, a pivotally adjustable guiding wheel connected to said axle, a pivotally adjustable member arranged adjacent said wheel, steering means for normally controlling the pivotal adjustment of said guiding wheel, means operated by said steering means for normally controlling the pivotal adjustment of said member, said member and said guiding wheel normally prevented from engagement with each other, and locking means for locking said member in fixed pivotal adjustment when said guiding wheel is not controlled in its pivotal adjustment by said steering means.

12. In a device of the character described an axle, a pivotally adjustable guiding wheel connected to said axle, a pivotally adjustable member arranged adjacent said wheel, means for normally limiting the pivotal movement of said guiding wheel, means for normally limiting the pivotal movement of said adjustable member, and means for locking said adjustable member in fixed position when said guiding wheel is not limited in its pivotal movement by its normal limiting means, said member adapted, when in its locked position, to engage said wheel to control its pivotal adjustment.

In testimony that I claim the above, I have hereunto subscribed my name in the presence of two witnesses.

OTTO KARCHER.

Witnesses:
 SYLVIA BORON,
 WILLIAM H. MILLER.